(12) United States Patent
Tang (10) Patent No.: US 12,041,659 B2
(45) Date of Patent: Jul. 16, 2024

(54) ACCESS CONTROL METHOD AND RELATED PRODUCT

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/621,551

(22) PCT Filed: Jun. 15, 2017

(86) PCT No.: PCT/CN2017/088525
§ 371 (c)(1),
(2) Date: Dec. 11, 2019

(87) PCT Pub. No.: WO2018/227510
PCT Pub. Date: Dec. 20, 2018

(65) Prior Publication Data
US 2020/0107374 A1 Apr. 2, 2020

(51) Int. Cl.
*H04W 74/0833* (2024.01)
*H04W 74/00* (2009.01)
*H04W 76/27* (2018.01)

(52) U.S. Cl.
CPC ..... *H04W 74/0833* (2013.01); *H04W 74/004* (2013.01); *H04W 74/006* (2013.01); *H04W 76/27* (2018.02)

(58) Field of Classification Search
CPC .......... H04W 74/0833; H04W 76/27; H04W 74/004; H04W 74/006
See application file for complete search history.

(56) References Cited

U.S. PATENT DOCUMENTS

| 8,189,684 B2 | 5/2012 | Hwang |
| 2008/0002777 A1 | 1/2008 | Hwang |

(Continued)

FOREIGN PATENT DOCUMENTS

| CN | 102300285 A | 12/2011 |
| CN | 102986258 A | 3/2013 |

(Continued)

OTHER PUBLICATIONS

CATT, "NR Access Control Mechanism," 3GPP TSG-RAN WG2 Meeting #97 (R2-1700981), Athens, Greece, Feb. 13-17, 2017, pp. 1-4 (Year: 2017).*

(Continued)

*Primary Examiner* — Un C Cho
*Assistant Examiner* — Lalita W Pace (57) ABSTRACT

Disclosed in embodiments of the present invention are an access control method and a related product. The method comprises: a user equipment obtains access category information of an access policy for uplink access, the access category information at least comprising first access category information separately defined by an access layer AS entity; and the user equipment initiates uplink access according to the access category information. The embodiments of the resent invention help to reduce reservation overheads of access policy information of an NAS layer, reduce signaling over heads between the NAS layer and an AS layer and improve the access control efficiency of a user equipment in an NR system.

11 Claims, 5 Drawing Sheets

(56) References Cited

U.S. PATENT DOCUMENTS

| | | | |
|---|---|---|---|
| 2013/0044702 A1 | 2/2013 | Jayaraman et al. | |
| 2013/0279426 A1 | 10/2013 | Wentink et al. | |
| 2014/0128029 A1 | 5/2014 | Fong | |
| 2014/0153463 A1* | 6/2014 | Park | H04W 52/0216 370/311 |
| 2015/0036489 A1 | 2/2015 | Rajadurai et al. | |
| 2015/0049608 A1 | 2/2015 | Palm et al. | |
| 2015/0237566 A1 | 8/2015 | Lee et al. | |
| 2016/0050615 A1 | 2/2016 | Fong | |
| 2016/0127980 A1 | 5/2016 | Fong et al. | |
| 2016/0227468 A1 | 8/2016 | Kim | |
| 2017/0013501 A1* | 1/2017 | Kim | H04W 48/06 |
| 2017/0078952 A1 | 3/2017 | Lee et al. | |
| 2017/0079081 A1 | 3/2017 | Kim | |
| 2017/0164269 A1 | 6/2017 | Fong et al. | |
| 2017/0223609 A1 | 8/2017 | Fong et al. | |
| 2017/0257791 A1 | 9/2017 | Rajadurai et al. | |
| 2017/0311229 A1* | 10/2017 | Pinheiro | H04W 28/0284 |
| 2017/0347310 A1 | 11/2017 | Lee et al. | |
| 2018/0199273 A1* | 7/2018 | Chun | H04W 48/14 |
| 2018/0220302 A1* | 8/2018 | Chen | H04W 48/06 |
| 2018/0324675 A1* | 11/2018 | Lee | H04W 48/02 |
| 2019/0174395 A1* | 6/2019 | Choe | H04W 72/56 |
| 2019/0253953 A1* | 8/2019 | Jia | H04W 74/02 |
| 2019/0320354 A1* | 10/2019 | Kim | H04L 1/189 |
| 2019/0380086 A1* | 12/2019 | Lee | H04W 48/08 |
| 2020/0008134 A1* | 1/2020 | Wallentin | H04W 48/16 |
| 2020/0100123 A1* | 3/2020 | Liang | H04W 48/02 |
| 2020/0187092 A1* | 6/2020 | Lindheimer | H04W 48/10 |
| 2021/0092668 A1* | 3/2021 | Zaus | H04W 74/08 |

FOREIGN PATENT DOCUMENTS

| | | |
|---|---|---|
| CN | 103733689 A | 4/2014 |
| CN | 103748811 A | 4/2014 |
| CN | 104322135 A | 1/2015 |
| CN | 104770016 A | 7/2015 |
| CN | 105407541 A | 3/2016 |
| CN | 105898894 A | 8/2016 |
| EP | 3319371 A1 | 5/2018 |
| EP | 3407666 A1 | 11/2018 |
| KR | 20140140595 A | 12/2014 |
| KR | 101516661 B1 | 5/2015 |
| KR | 20160012244 A | 2/2016 |
| KR | 20160019552 A | 2/2016 |
| RU | 2605437 C2 | 12/2016 |
| WO | 2015137731 A1 | 9/2015 |
| WO | 2016118104 A1 | 7/2016 |
| WO | 2016118282 A1 | 7/2016 |
| WO | 2016153310 A1 | 9/2016 |
| WO | 2017052342 A1 | 3/2017 |
| WO | 2017054154 A1 | 4/2017 |
| WO | 2017054183 A1 | 4/2017 |
| WO | 2018142203 A1 | 8/2018 |

OTHER PUBLICATIONS

Notice of Rejection of the Chinese application No. 201780052225.3, issued on Jun. 22, 2020.
Written Opinion of the International Search Authority in the international application No. PCT/CN2017/088525, mailed on Nov. 29, 2017.
Nokia, Alcatel-Lucent Shanghai Bell, Qualcomm Incorporated; "Uplink bearer identification", 3GPP TSG-RAN WG3 Meeting #95 R3-170371, Feb. 17, 2017, entire document.
First Office Action of the European application No. 17913649.4, issued on Dec. 14, 2020.
Notice of Allowance of the Chinese application No. 201780052225.3, issued on Jan. 14, 2021.
Second Office Action of the Russian application No. 2020100581, issued on Feb. 9, 2021.
First Office Action of the Korean application No. 10-2020-7000476, issued on Mar. 5, 2021.
Supplementary European Search Report in the European application No. 17913649.4, mailed on Mar. 23, 2020.
Second Office Action of the Chinese application No. 201780052225.3, issued on Apr. 1, 2020.
International Search Report in the international application No. PCT/CN2017/088525, mailed on Nov. 30, 2017.
Ericsson. "Access Control for NR", 3GPP TSG-RAN WG2 #97, Tdoc R2-1700911, Athens, Greece, Feb. 13-17, 2017, Feb. 4, 2017 (Feb. 4, 2017), sections 2.1.
CATT. "NR Access Control Mechanism", 3GPP TSG-RAN WG2 Meeting #97, R2-1700981, Athens, Greece, Feb. 13-17, 2017, Feb. 4, 2017 (Feb. 4, 2017), sections 2.2.
Media Tek Inc. "Unified Access Control", SA WG2 Meeting #119, S2-171165, Feb. 13-17, 2017, Dubrovnik, Croatia, Feb. 7, 2017 (Feb. 7, 2017), sections 2.1 and 2.1.4.
Media Tek Inc. "Unified Access Control" SA WG2 Meeting #120, S2-171888, Mar. 27-31, 2017, Busan, Korea, Mar. 21, 2017 (Mar. 21, 2017), sections 2.1.2, 2.1.4 and 2.1.5.
First Office Action of the Russian application No. 2020100581, issued on Sep. 24, 2020.
First Office Action of the Chinese application No. 201780052225.3, issued on Dec. 20, 2019.
First Office Action of the Canadian application No. 3067072, issued on Mar. 25, 2021.
Office Action of the Indian application No. 201917052060, issued on Apr. 15, 2021.
Written Opinion of the Singaporean application No. 11201912027U, issued on Apr. 27, 2021.
Second Office Action of the European application No. 17913649.4, issued on May 26, 2021.
3GPP TSG CT WG1 Meeting #103 C1-171579, Spokane (WA), USA, Apr. 3-7, 2017; Source: MediaTek Inc.; Title: Discussion on Unified Access Control in 5GS.
Notice of Allowance of the Japanese application No. 2019-569434, issued on Jul. 2, 2021.
3GPP TSG-RAN WG2 #97 R2-1702441, Athens, Greece, Feb. 13-17, 2017; Title: LS on Access Control for NR; Source: RAN2.
3GPP TSG-RAN WG2 Meeting #98 R2-1705184, Hangzhou, China, May 15-19, 2017; Agenda Item: 10.4.1.7; Source: Huawei, HiSilicon; Title: Access Control in RRC_INACTIVE.
Notice of Allowance of the Korean application No. 10-2020-7000476, issued on Sep. 16, 2021.
Third Office Action of the European application No. 17913649.4, issued on Nov. 18, 2021.
First Office Action of the Korean application No. 10-2021-7041390, issued on Jan. 12, 2022.
Second Office Action of the Canadian application No. 3067072, issued on Jan. 24, 2022.
Fourth Office Action of the European application No. 17913649.4, issued on May 10, 2022.
Notice of Allowance of the Korean application No. 10-2021-7041390, issued on Jul. 5, 2022.
3GPP TSG-RAN WG2 #98 R2-1705712, Hangzhou, China, May 15-19, 2017, Title: Access Control for UE accessing 5GC via LTE, Source: Huawei, HiSilicon, Agenda item: 9.7.2, Document for: Discussion.
3GPP TSG-RAN WG2 #98 Tdoc R2-1704357, Hangzhou, P.R. of China, May 15-19, 2017, Agenda Item: 10.4.1.7, Source: Ericsson, Title: Establishment causes for NR, Document for: Discussion, Decision.
First Office Action of the Japanese application No. 2021-125146, issued on Jul. 8, 2022.
First Office Action of the Indonesian application No. P00202000364, issued on Jul. 29, 2022.
First Office Action of the Australian application No. 2017418624, issued on Aug. 29, 2022.
Fifth Office Action of the European application No. 17913649.4, issued on Nov. 2, 2022.
Second Office Action of the Mexican application No. MX/a/2019/015132, issued on Jun. 28, 2023, 8 pages with English translation.
Notice of oral proceedings of the European application No. 17913649.4, issued on May 19, 2023.

(56) References Cited

OTHER PUBLICATIONS

First Office Action of the Mexican application No. MX/a/2019/015132, issued on Mar. 24, 2023.
3GPP TSG-RAN WG2 Meeting #98 R2-1704243, Hangzhou, China, May 15-19, 2017, Source: CATT, Title: Consideration on Access Control, Agenda Item: 10.4.1.7, Document for: Discussion and Decision. the whole document. 2 pages.
3GPP TSG-RAN2 Meeting #98 R2-1705677, Hangzhou, China, May 15-19, 2017, Agenda item: 9.7.2 (LTE connectivity to 5G-CN), Source: LG Electronics Inc., Title: Access control for LTE connected to 5G-CN, Document for: Discussion and Decision. the whole document. 3 pages.
Notice of Allowance of the European application No. 17913649.4, issued on Jan. 29, 2024. 31 pages.
Hearing Notice of the Indian application No. 201917052060, issued on Nov. 16, 2023. 2 pages with English translation.

* cited by examiner

ACCESS CONTROL METHOD AND RELATED PRODUCT

TECHNICAL FIELD

The disclosure relates to the technical field of communications, and in particular to an access control method and a related product.

BACKGROUND

In a wireless communication system, a terminal needs to establish a connection with a network, which is commonly referred to as a random access process.

In a Long Term Evolution (LTE) system, the following situations usually require the random access process: a wireless link is established in an initial access of a terminal (switched from a Radio Resource Control (RRC) idle state RRC_IDLE to a connected state RRC_CONNECTED); a link is re-established after the wireless link is interrupted; the terminal needs to establish uplink synchronization with a target cell during switching; when the terminal is in the connected state and the terminal is not uplink-synchronized, uplink synchronization is established when uplink or downlink data arrives; user location is performed based on uplink measurement; and when a dedicated scheduling request resource is not allocated to a Physical Uplink Control Channel (PUCCH), a scheduling request is performed.

In LTE, the random access process is divided into a contention-based random access process and a non-contention-based random access process. The contention-based random access process usually consists of the following operations: a terminal randomly selects a random access preamble sequence in a random access preamble sequence set, and transmits the selected random access preamble sequence on a random access resource (Physical Random Access Channel (PRACH)) pre-specified by a base station eNB; the terminal receives a Random Access Response (RAR) message issued by the base station on a Physical Downlink Shared Channel (PDSCH); the terminal needs to transmit, according to a Cell-Radio Network Temporary Identity (C-RNTI) included in the RAR message, a random access process message including an identity of the terminal in the present cell to the eNB on a Physical Uplink Shared Channel (PUSCH) specified in the RAR message, for contention resolution; and moreover, the terminal needs to receive a contention resolution message transmitted by the eNB, thereby completing the random access process. For the non-contention-based random access process, the terminal uses a random access resource pre-specified by the base station to transmit a random access preamble sequence pre-specified by the base station; and the terminal determines, according to whether a RAR message corresponding to the preamble sequence sent by the terminal is received, whether random access is successful.

A 5th-Generation (5G) mobile communication technology NR is a newly proposed topic in a 3rd Generation Partnership Project (3GPP) organization. With the gradual deepening of the discussion of the new generation of 5G technology, on the one hand, because a communication system is backward compatible, a new technology developed later tends to be compatible with the previously standardized technology; on the other hand, because the 4th Generation (4G) mobile communication technology LTE has a large number of existing designs, it is inevitable to sacrifice a lot of flexibility of 5G in order to achieve compatibility, thereby reducing the performance. Therefore, there are currently two parallel studies in the 3GPP organization, where the discussion group without considering backward-compatible technology is called 5G NR.

A 5G/NR system introduces the concept of on-demand SI, that is, a User Equipment (UE) needs to acquire some system messages (such as secondary information block SIB1) by sending uplink requests. These uplink requests may be implemented by a Random Access Channel (RACH) preamble or an MSG3 message (such as a RRC connection request). The uplink request may be sent by a user in the idle state. However, different from an uplink access request in a traditional idle state, the uplink access request is initiated by an Access Stratum (AS) itself rather than a Non-Access Stratum (NAS). If an uplink request of a system message is implemented by an MSG3 message, this means that MSG1 (such as a RACH preamble) may be mixed with other RACH preambles used for other purposes in the same PRACH resource, this means that it is necessary to perform access control on a RACH process used as a system message request.

SUMMARY

Embodiments of the disclosure provide an access control method and a related product, which are intended to reduce reservation overheads of access category information of a NAS, reduce signaling overheads between the NAS and AS, and improve the access control efficiency of a UE in an NR system.

According to a first aspect, an embodiment of the disclosure provides an access control method, which may include:
a UE acquires access category information for uplink access, the access category information at least including first access category information independently defined by an AS entity; and
the UE initiates uplink access according to the access category information.

According to a second aspect, an embodiment of the disclosure provides an access control method, which may include:
a base station receives access category information transmitted by a UE, the access category information being transmitted after the UE performs an access barring operation to perform uplink access according to the access category information, and the access category information at least including first access category information independently defined by an AS entity; and
the base station performs access control for the UE according to the access category information.

According to a third aspect, an embodiment of the disclosure provides a UE, which may include an acquiring unit and an initiating unit, where
the acquiring unit is configured to acquire access category information for uplink access, the access category information at least including first access category information independently defined by an AS entity; and
the initiating unit is configured to initiate uplink access according to the access category information.

According to a fourth aspect, an embodiment of the disclosure provides a base station, which may include a receiving unit and an access unit, where
the receiving unit is configured to receive access category information transmitted by a UE, the access category information being transmitted after the UE performs an access barring operation to perform uplink access according to the access category information, and the access category information at least including first access category information independently defined by an AS entity; and the access unit is configured to perform access control for the UE according to the access category information.

According to a fifth aspect, an embodiment of the disclosure provides a UE, which may include a processor, a memory, a radio frequency chip, and programs, where the programs are stored in the memory and configured to be executed by the processor, and the programs include instructions for performing operations in any method according to the first aspect of the embodiment of the disclosure.

According to a sixth aspect, an embodiment of the disclosure provides a base station, which may include a processor, a memory, a communication interface, and programs, where the programs are stored in the memory and configured to be executed by the processor, and the programs include instructions for performing operations in any method according to the second aspect of the embodiment of the disclosure.

According to a seventh aspect, an embodiment of the disclosure provides a computer storage medium, which may store computer programs, where the computer programs enable a computer to perform operations in any method according to the first aspect or the second aspect of the embodiment of the disclosure, and the computer includes a base station and a UE.

According to an eighth aspect, an embodiment of the disclosure provides a computer program product, which may include computer programs. The computer programs may be operated to enable a computer to perform operations in any method according to the first aspect or the second aspect of the embodiment of the disclosure. The computer may include a base station and a UE.

It can be seen that in the embodiments of the disclosure, a UE firstly acquires access category information for uplink access, and the UE secondly initiates uplink access according to the access category information. The acquired access category information at least includes first access category information independently defined by an AS entity, that is, the access category information required by the UE is not all acquired from a NAS entity, or is not acquired from a NAS. For an uplink access request initiated by an AS itself, the mode may reduce inter-layer signaling overheads between the NAS and the AS, and may help to improve the access control efficiency of a UE in an NR system.

BRIEF DESCRIPTION OF DRAWINGS

The drawings required to be used in the description of the embodiments or the prior art will be briefly described below.

DETAILED DESCRIPTION

Figure 1:
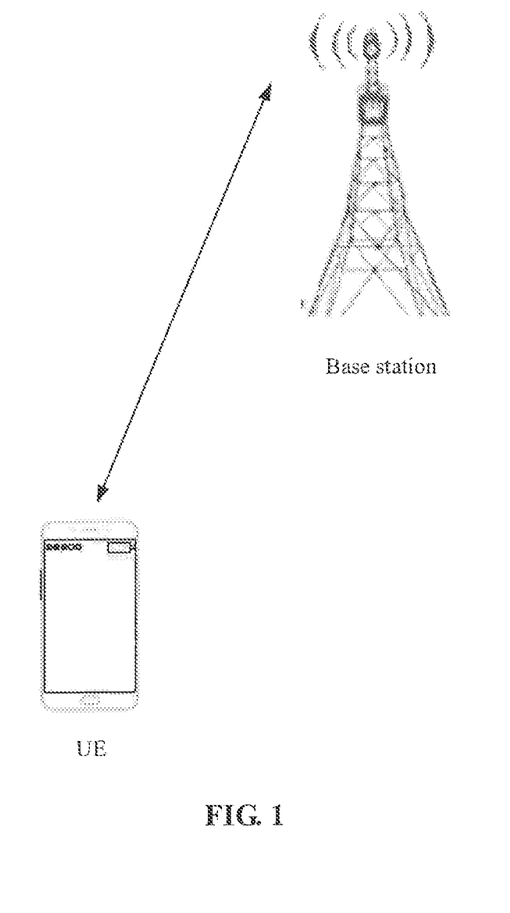
FIG. 1 is a possible network architecture of an exemplary communication system according to an embodiment of the disclosure.

Please refer to FIG. 1. FIG. 1 is a possible network architecture of an exemplary communication system according to an embodiment of the disclosure. The exemplary communication system may be, for example, a 5G/NR system and other such communication systems. The exemplary communication system specifically includes a UE and a base station. When the UE accesses a mobile communication network provided by the base station, a terminal may be communicatively connected to the base station through a wireless link. The wireless link may be a single-connection mode or a dual-connection mode or a multi-connection mode. When the communication connection mode is the single-connection mode, the base station is also called a gNB base station. When the communication mode is the dual-connection mode (specifically, it may be implemented by a Carrier Aggregation CA technology or a plurality of base stations), and when the UE is connected to a plurality of base stations, the plurality of base stations may be a Master Cell Group (MCG) and a Secondary Cell Group (SCG). Between the base stations, data is hauled back through a backhaul link. The MCG and the SCG may be gNR base stations.

In the embodiments of the disclosure, terms "network" and "system" are often used alternately, but those skilled in the art may understand the meaning thereof. A terminal involved in the embodiments of the disclosure may include various handheld devices, in-vehicle devices, wearable devices and computing devices having a wireless communication function, or other processing devices connected to a wireless modem, and various forms of UEs, Mobile Stations (MS), terminal devices, and the like. For convenience of description, the devices mentioned above are collectively referred to as terminals.

The technical solutions in the embodiments of the disclosure will be described in detail below with reference to the accompanying drawings.

Figure 2A:
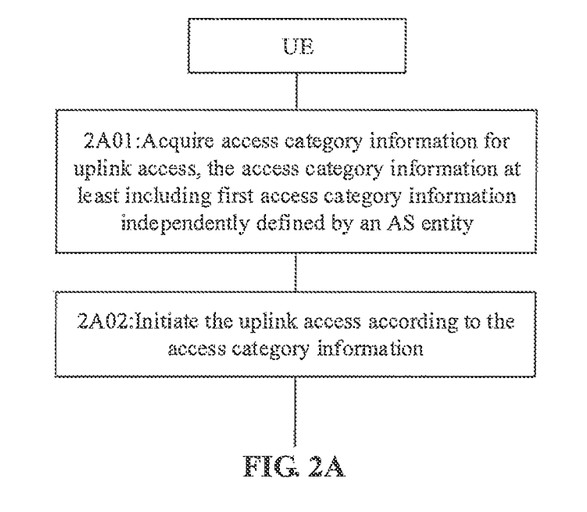
FIG. 2A is a schematic communication diagram of an access control method according to an embodiment of the disclosure.

Please refer to FIG. 2A. FIG. 2A is a schematic flow chart of an access control method according to an embodiment of the disclosure. The method, applied to a 5G/NR communication system including a UE and a base station, includes the following operations.

At 2A01, the UE acquires access category information for uplink access. The access category information at least includes first access category information independently defined by an AS entity.

At 2A02, the UE initiates uplink access according to the access category information.

It can be seen that in the embodiments of the disclosure, a UE firstly acquires access category information for uplink access, and the UE secondly initiates uplink access according to the access category information. The acquired access category information at least includes first access category information independently defined by an AS entity. That is, the access category information needed by the UE is not all acquired from a NAS entity, or is not acquired from a NAS. For an uplink access request initiated by an AS itself, the mode may reduce inter-layer signaling overheads between the NAS and the AS, and may help to improve the access control efficiency of a UE in an NR system.

In a possible example, the operation that the UE initiates uplink access according to the access category information includes: the UE performs an access barring operation according to the access category information to perform uplink access.

In a process of acquiring, by the UE, whether to access a current system according to an access category and its own access class, it is also necessary to combine some parameters for access control broadcast by the system.

It is apparent that in the present example, for the case where the UE applies for system information, since the UE only appeals to obtain the system information, it is not necessary to establish an RRC connection with a network side device, and the UE only needs to perform access control. It is beneficial to improve the processing efficiency of a UE to acquire system information.

In a possible example, the UE initiates uplink access according to the access category information includes the following operations. The UE performs an access barring operation according to the access category information to initiate uplink access. The UE transmits the access category information. The access category information is used for the base station to perform uplink access control for the UE.

The UE may transmit the access category to the network side device in MSG3, that is, an RRC connection establishment request.

It is apparent that in the present example, for the case where the UE applies for establishing an RRC connection, the network side device needs to further control an uplink access request (that is, the transmitted access category) of the UE. Therefore, the user needs to further transmit the access category to a network, thereby achieving a rapid establishment of the RRC connection.

In the above possible example, the access barring operation includes at least one of the following operations: Access Category Prohibited (ACB), Extended Access Prohibited (EAB), Reverse Service Specific Access Control (SSAC), or Application Specific Congestion Control for Data Communication (ACDC).

In a possible example, the UE acquires access category information for uplink access includes the following operations. The UE acquires the first access category information independently defined by the AS entity, and determines the first access category information as access category information for uplink access.

When the uplink request process is triggered by the AS, the above access category may be self-determined by the AS.

It is apparent that in the present example, for the case where the UE applies for system information, since the UE only appeals to obtain the system information, it is not necessary to establish an RRC connection with a network side device, and the UE only needs to perform access control. It is beneficial to improve the processing efficiency of a UE to acquire system information.

In a possible example, the UE acquires access category information for uplink access includes the following operations. The UE acquires first access category information independently defined by the AS entity, and acquires second access category information defined by a NAS; and the UE determines access category information for uplink access according to the first access category information and the second access category information.

When the uplink request process is triggered by the AS, the access category may be self-determined by the AS. However, the uplink request process triggered by the NAS may be triggered at the same time. In this case, both need to be considered at the same time.

It is apparent that in the present example, for the case where the UE applies for system information, since the UE only appeals to obtain the system information, it is not necessary to establish an RRC connection with a network side device, and the UE only needs to perform access control. It is beneficial to improve the processing efficiency of a UE to acquire system information. For the case where the UE applies for establishing an RRC connection, the network side device needs to further control an uplink access request (that is, the transmitted access category) of the UE. Therefore, the user needs to further send the access category to a network, thereby achieving a rapid establishment of the RRC connection.

In a possible example, the access category information includes: a call type, or the call type and an RRC establishment cause.

Figure 2B:
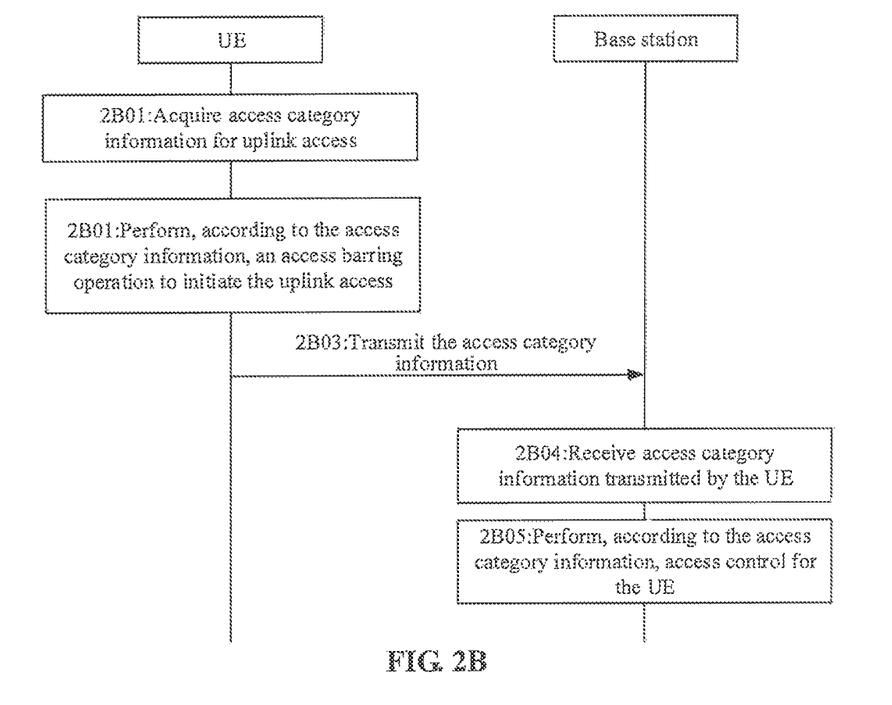
FIG. 2B is a schematic communication diagram of another access control method according to an embodiment of the disclosure.

Consistent with FIG. 2A, FIG. 2B is a schematic flow chart of an access control method according to an embodiment of the disclosure. The method, applied to a 5G/NR communication system including a UE and a base station, includes the following operations.

At S2B01, the UE acquires access category information for uplink access. The access category information at least includes first access category information independently defined by an AS entity.

At S2B02, the UE performs an access barring operation according to the access category information to initiate uplink access.

At S2B03, the UE transmits the access category information. The access category information is used for the base station to perform uplink access control for the UE.

At S2B04, the base station receives access category information transmitted by the UE. The access category information being transmitted after the UE performs an access barring operation to perform uplink access according to the access category information, and the access category information at least includes first access category information independently defined by an AS entity.

At S2B05, the base station performs access control for the UE according to the access category information.

It can be seen that in the embodiments of the disclosure, a UE firstly acquires access category information for uplink access, performs an access barring operation according to the access category information to initiate uplink access, and transmits the access category information. A base station receives the access category information transmitted by the UE and performs access control for the UE according to the access category information. The acquired access category information at least includes first access category information independently defined by an AS entity, that is, the access category information required by the UE is not all acquired from a NAS entity, or is not acquired from a NAS. For an uplink access request initiated by an AS itself, the mode may reduce inter-layer signaling overheads between the NAS and the AS, and may help to improve the access control efficiency of a UE in an NR system.

In a possible example, the access barring operation includes at least one of the following operations: Access Category Prohibited (ACB), Extended Access Prohibited (EAB), Reverse Service Specific Access Control (SSAC), and Application Specific Congestion Control for Data Communication (ACDC).

In a possible example, the access category information includes: a call type, or the call type and an RRC establishment cause.

The embodiments of the disclosure are specifically described below in conjunction with specific application scenarios.

Figure 3:
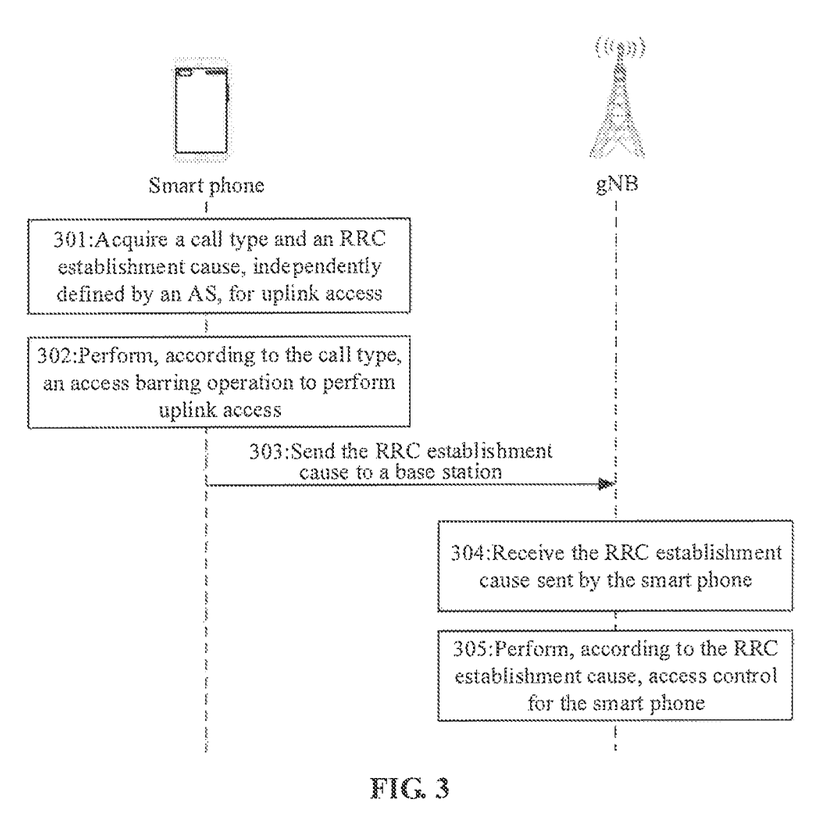
FIG. 3 is a schematic diagram of implementing data mapping transmission by a 5G NR system according to an embodiment of the disclosure.

As shown in FIG. 3, it is assumed that a UE is a smart phone, a base station is a gNB in a 5G/NR system, and access category information independently defined by an AS includes a call type and an RRC establishment cause. The access control method disclosed in the embodiment of the disclosure includes the following operations.

At S301, the smart phone acquires a call type and an RRC establishment cause, independently defined by an AS, for uplink access.

At S302, the smart phone performs an access barring operation according to the call type to perform uplink access.

At S303, the smart phone transmits the RRC establishment cause to the base station.

At S304, the base station receives the RRC establishment cause transmitted by the smart phone.

At S305, the base station performs access control for the smart phone according to the RRC establishment cause.

It is apparent that in the present scenario example, since the call type and the RRC establishment cause for uplink access are independently defined by the AS, the smart phone does not need to perform signaling interaction from the NAS to acquire the above information. For an uplink access request initiated by an AS itself, the mode may reduce inter-layer signaling overheads between the NAS and the AS, and may help to improve the access control efficiency of a UE in an NR system.

Figure 4:
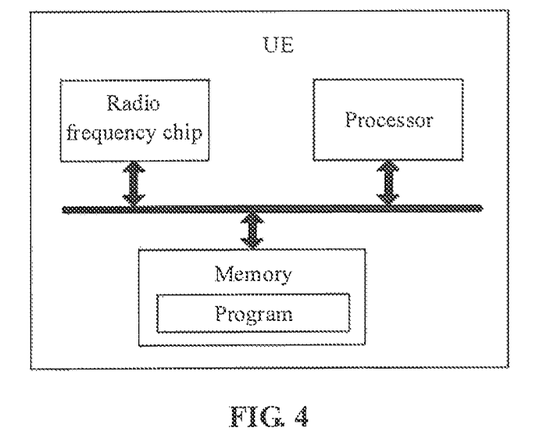
FIG. 4 is a schematic structure diagram of a UE according to an embodiment of the disclosure.

Consistent with the embodiment shown in FIG. 2A, please refer to FIG. 4. FIG. 4 is a schematic structure diagram of a UE according to an embodiment of the disclosure. As shown in the figure, the UE includes a processor, a memory, a radio frequency chip, and programs, where the programs are stored in the memory and configured to be executed by the processor, and the programs include an instruction for performing the following operations.

Acquiring the access category information for the uplink access, the access category information at least including first access category information independently defined by an AS entity; and initiating uplink access according to the access category information.

It can be seen that in the embodiments of the disclosure, a UE firstly acquires access category information for uplink access, and the UE secondly initiates uplink access according to the access category information. The acquired access category information at least includes first access category information independently defined by an AS entity, that is, the access category information required by the UE is not all acquired from a NAS entity, or is not acquired from a NAS. For an uplink access request initiated by an AS itself, the mode may reduce inter-layer signaling overheads between the NAS and the AS, and may help to improve the access control efficiency of a UE in an NR system.

In a possible example, in terms of initiating uplink access according to the access category information, the instructions in the programs are specifically used for performing the following operation: performing an access barring operation according to the access category information to perform uplink access.

In a possible example, in terms of initiating uplink access according to the access category information, the instructions in the programs are specifically used for performing the following operations: performing an access barring operation according to the access category information to initiate uplink access; and transmitting the access category information. The access category information is used for a base station to perform uplink access control for the UE.

In a possible example, the access barring operation includes at least one of the following operations: ACB, EAB, SSAC, and ACDC.

In a possible example, in terms of acquiring access category information for uplink access, the instruction in the program is specifically used for performing the following operations: acquiring first access category information independently defined by the AS entity, and determining the first access category information as access category information for uplink access.

In a possible example, in terms of acquiring access category information for uplink access, the instructions in the programs are specifically used for performing the following operations: acquiring first access category information independently defined by the AS entity, and acquiring second access category information defined by a NAS; and determining access category information for uplink access according to the first access category information and the second access category information.

In a possible example, the access category information includes: a call type, or the call type and an RRC establishment cause.

Figure 5:
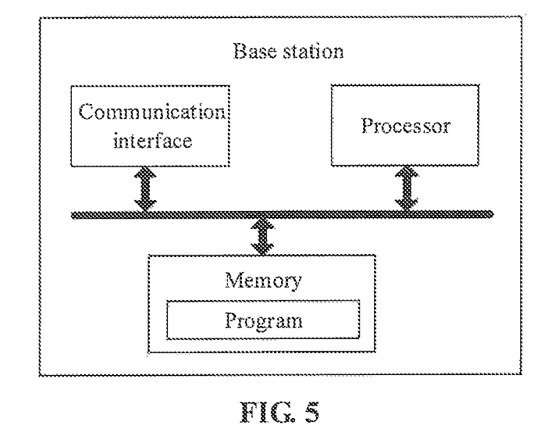
FIG. 5 is a schematic structure diagram of a base station according to an embodiment of the disclosure.

Consistent with the embodiment shown in FIG. 2B, please refer to FIG. 5. FIG. 5 is a schematic structure diagram of a base station according to an embodiment of the disclosure. As shown in the figure, the base station includes a processor, a memory, a communication interface, and programs, where the programs are stored in the memory and configured to be executed by the processor, and the programs include instructions for performing the following operations.

Receiving access category information transmitted by a UE. The access category information is transmitted after the UE performs an access barring operation to perform uplink access according to the access category information. The access category information at least includes first access category information independently defined by an AS entity. Performing, according to the access category information, access control for the UE.

It can be seen that in the embodiments of the disclosure, a UE firstly acquires access category information for uplink access, and the UE secondly initiates uplink access according to the access category information. The acquired access category information at least includes first access category information independently defined by an AS entity, that is, the access category information required by the UE is not all acquired from a NAS entity, or is not acquired from a NAS. For an uplink access request initiated by an AS itself, the mode may reduce inter-layer signaling overheads between the NAS and the AS, and may help to improve the access control efficiency of a UE in an NR system.

In a possible example, the access barring operation includes at least one of the following operations: ACB, EAB, SSAC, and ACDC.

In a possible example, the access category information includes: a call type, or the call type and an RRC establishment cause.

The solution of the embodiments of the disclosure is introduced above mainly from the perspective of interaction between network elements. It will be appreciated that the UE and the base station include corresponding hardware structures and/or software modules for performing the respective functions in order to implement the above functions. Those skilled in the art may easily realize that the units and algorithm operations of each example described in combination with the embodiments disclosed in the disclosure may be implemented by hardware or a combination of hardware and computer software in the disclosure. Whether a certain function is executed by the hardware or in a manner of driving the hardware by the computer software depends on specific applications and design constraints of the technical solutions. Professionals may implement the described functions for each specific application by use of different methods, but such implementation shall fall within the scope of the disclosure.

According to the embodiments of the disclosure, functional units of the UE and the base station may be divided according to the above method examples. For example, each functional unit may be divided correspondingly to each function and two or more than two functions may also be integrated into a processing unit. The integrated unit may be implemented in the form of hardware and may also be implemented in the form of a software program module. It is to be noted that division of the units in the embodiments of the disclosure is schematic and only logical function division and another division manner may be adopted during practical implementation.

Figure 6:
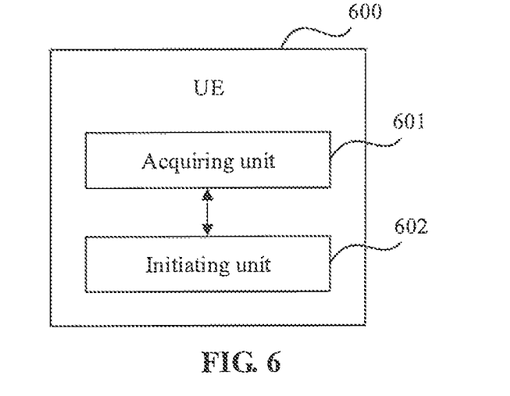
FIG. 6 is a composition block diagram of a UE according to an embodiment of the disclosure.

Under the condition of adopting the integrated unit, FIG. 6 is a composition block diagram of a possible functional unit of a UE according to an embodiment of the disclosure. The UE is applied to the above UE of the above embodiment. The UE 600 includes: an acquiring unit 601 and an initiating unit 602.

The acquiring unit 601 is configured to acquire access category information for uplink access. The access category information at least includes first access category information independently defined by an AS entity.

The initiating unit 602 is configured to initiate uplink access according to the access category information.

In a possible example, in terms of initiating uplink access according to the access category information, the initiating unit 602 is specifically configured to perform an access barring operation according to the access category information to perform uplink access.

In a possible example, in terms of initiating uplink access according to the access category information, the initiating unit 602 is specifically configured to: perform an access barring operation according to the access category information to initiate uplink access; and transmit the access category information. The access category information is used for a base station to perform uplink access control for the UE.

In a possible example, the access barring operation includes at least one of the following operations: ACB, EAB, SSAC, and ACDC.

In a possible example, in terms of acquiring access category information for uplink access, the acquiring unit 601 is specifically configured to: acquire first access category information independently defined by the AS entity, and determine the first access category information as access category information for uplink access.

In a possible example, in terms of acquiring access category information for uplink access, the acquiring unit 601 is independently configured to: acquire first access category information separately defined by the AS entity, and acquire second access category information defined by a NAS; and determine access category information for uplink access according to the first access category information and the second access category information.

In a possible example, the access category information includes: a call type, or the call type and an RRC establishment cause.

The acquiring unit 601 may be a processor, and the initiating unit 602 may be a radio frequency chip or the like.

When the acquiring unit 601 is a processor and the initiating unit 602 is a radio frequency chip, the UE involved in the embodiment of the disclosure may be the UE shown in FIG. 4.

Figure 7:
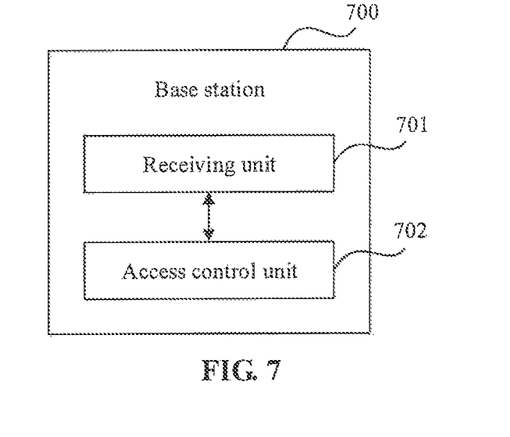
FIG. 7 is a composition block diagram of a base station according to an embodiment of the disclosure.

Under the condition of adopting the integrated unit, FIG. 7 is a composition block diagram of a possible functional unit of a base station according to an embodiment of the disclosure. The base station is applied to a base station. The base station 700 includes: a receiving unit 701 and an access control unit 702.

The receiving unit 701 is configured to receive access category information transmitted by a UE. The access category information is transmitted after the UE performs an access barring operation to perform uplink access according to the access category information. The access category information at least includes first access category information separately defined by an AS entity.

The access control unit 702 is configured to perform access control for the UE according to the access category information.

In a possible example, the access barring operation includes at least one of the following operations: ACB, EAB, SSAC, and ACDC.

In a possible example, the access category information includes: a call type, or the call type and an RRC establishment cause.

The receiving unit 701 may be a communication interface, and the access control unit 702 may be a processor.

When the receiving unit 701 is a communication interface and the access control unit 702 is a processor, the base station involved in the embodiment of the disclosure may be the base station shown in FIG. 5.

An embodiment of the disclosure also provides a computer storage medium, which stores computer programs, where the computer programs enable a computer to perform any of the above operations in the embodiment of the disclosure, and the computer includes a base station and a UE.

An embodiment of the disclosure also provides a computer program product, which includes computer programs. The computer programs may be operated to enable a computer to perform any of the above operations in the embodiment of the disclosure. The computer includes a base station and a UE.

The operations of the method or algorithm described in the embodiments of the disclosure may be implemented in a hardware manner, or may be implemented by a processor executing a software instruction. The software instruction may be composed of corresponding software modules, which may be stored in a Random Access Memory (RAM), a flash memory, a Read Only Memory (ROM), an Erasable Programmable ROM (EPROM), an Electrically EPROM (EEPROM), a register, a hard disk, a mobile hard disk, a Compact Disk ROM (CD-ROM) or any other forms of storage medium known in the art. An exemplary storage medium is coupled to the processor to enable the processor to read information from, and write information to, the storage medium. Of course, the storage medium may also be a component of the processor. The processor and the storage medium may be located in an ASIC. Additionally, the ASIC may be located in an access network device, a target network device, or a core network device. Of course, the processor and the storage medium may also exist, as discrete components, in the access network device, the target network device or the core network device.

Those skilled in the art should realize that in one or more of the above examples, the functions described in the embodiments of the disclosure may be implemented entirely or partially in hardware, software, firmware, or any combination thereof. When implemented in software, it may be implemented entirely or partially in the form of a computer program product. The computer program product includes one or more computer instructions. When the computer program instructions are loaded and executed on the computer, the flows or functions according to the embodiments of the disclosure are generated entirely or partially. The computer may be a general purpose computer, a dedicated computer, a computer network or another programmable device. The computer instructions may be stored in a computer storage medium or transmitted from one computer storage medium to another computer storage medium. For example, the computer instructions may be borne and transmitted from one website, computer, server or data center to another website, computer, server or data center in a wired (for example, coaxial cable, optical fiber and Digital Subscriber Line (DSL) or wireless (for example, infrared, wireless and microwave) manner. The computer storage medium may be any available medium accessible for the computer or an integrated data storage device such as a server and a data center, including one or more available media. The available medium may be a magnetic medium (for example, a floppy disk, a hard disk and a magnetic tape), an optical medium (for example, a Digital Video Disc (DVD), a semiconductor medium (for example, a Solid State Disk (SSD)) or the like.

The above specific implementation manner further describes the purposes, technical solutions and beneficial effects of the embodiments of the disclosure. It will be appreciated that the above is only the specific implementation manner of the embodiments of the disclosure, and is not intended to limit the scope of protection of the embodiments of the disclosure. Any modifications, equivalent replacements, improvements and the like made on the basis of the technical solutions of the embodiments of the disclosure should be included in the scope of protection of the embodiments of the disclosure.

The invention claimed is:

1. An access control method for $5^{th}$-Generation (5G) New Radio (NR) system, wherein the method comprises:
   acquiring, by a User Equipment (UE), an access category for an uplink access request triggered by an Access Stratum (AS) entity of the UE, wherein the access category is self-determined by the AS entity without signaling interaction with a Non-Access Stratum (NAS) entity, and the access category includes a call type and a Radio Resource Control (Rn) establishment cause;
   initiating, by the UE, the uplink access request according to the access category, comprising:
   performing, by the UE according to the access category, an access barring operation to perform the uplink access request.

2. The method of claim 1, wherein initiating, by the UE, the uplink access request according to the access category comprises:
   performing, by the UE according to the access category, an access barring operation to initiate the uplink access request; and
   transmitting, by the UE, the access category to a base station.

3. The method of claim 1, wherein the access barring operation comprises the following operations: Access Category Prohibited (ACB), Extended Access Prohibited (EAB), Reverse Service Specific Access Control (SSAC), and Application Specific Congestion Control for Data Communication (ACDC).

4. The method of claim 1, wherein the performing, by the UE according to the access category, an access barring operation to perform the uplink access request comprises:
   performing, by the UE according to the access category and an access class of the UE, an access, barring operation to perform the uplink access request.

5. The method of claim 2, wherein the access category is transmitted in a Radio Resource Control (RRC) connection establishment request.

6. An access control method for $5^{th}$-Generation (5G) New Radio (NR) system, wherein the method comprises:
   receiving, by a base station, an access category transmitted by a User Equipment (UE), the access category being transmitted after the UE performs an access barring operation to perform an uplink access request triggered by an Access Stratum (AS) entity of the UE according to the access category, wherein the access category is self-determined by the AS entity without signaling interaction with a Non-Access Stratum (NAS) entity, and the access category includes a call type and a Radio Resource Control (RRC) establishment cause; and
   performing, by the base station according to the access category, access control for the UE.

7. The method of claim 6, wherein the access barring operation comprises the following operations: Access Category Prohibited (ACB), Extended Access Prohibited (EAB), Reverse Service Specific Access Control (SSAC), and Application Specific Congestion Control for Data Communication (ACDC).

8. A User Equipment (UE), comprising:
   a processor; and
   a memory for storing instructions executable by the processor;
   wherein execution of the instructions by the processor causes the processor to perform actions for $5^{th}$-Generation (5G) New Radio (NR) system comprising:
   acquiring an access category for an uplink access request triggered by an Access Stratum (AS) entity of the UE, wherein the access category is self-determined by the AS entity without signaling interaction with a Non-Access Stratum (NAS) entity, and the access category includes a call type and a Radio Resource Control (RRC) establishment cause; and
   initiating the uplink access request according to the access category, comprising:
   performing, according to the access category, an access barring operation to perform the uplink access request.

9. The UE of claim 8, wherein initiating the uplink access request according to the access category comprises:
   performing, according to the access category, an access barring operation to initiate the uplink access request; and
   transmitting the access category to a base station.

10. The UE of claim 8, wherein the access barring operation comprises the following operations: Access Category Prohibited (ACB), Extended Access Prohibited (EAB), Reverse Service Specific Access Control (SSAC), and Application Specific Congestion Control for Data Communication (ACDC).

11. The UE of claim 9, wherein the access category is transmitted in a Radio Resource Control (RRC) connection establishment request.

* * * * *